United States Patent
Choi (10) Patent No.: US 7,283,789 B2
(45) Date of Patent: Oct. 16, 2007

(54) APPARATUS AND METHOD FOR TRANSMITTING WIRELESS DATA USING AN ADAPTIVE FREQUENCY SELECTION

(75) Inventor: Suk-whan Choi, Uiwang-si (KR)

(73) Assignee: Open Solution Co., Ltd. (KR)

( * ) Notice: Subject to any disclaimer, the term of this patent is extended or adjusted under 35 U.S.C. 154(b) by 213 days.

(21) Appl. No.: 10/527,923

(22) PCT Filed: Nov. 14, 2002

(86) PCT No.: PCT/KR02/02123

§ 371 (c)(1),
(2), (4) Date: Mar. 16, 2005

(87) PCT Pub. No.: WO2004/025864

PCT Pub. Date: Mar. 25, 2004

(65) Prior Publication Data

US 2005/0272434 A1    Dec. 8, 2005

(30) Foreign Application Priority Data

Sep. 16, 2002  (KR) ...................... 10-2002-0056181

(51) Int. Cl.
*H04B 1/00* (2006.01)
*H04B 15/00* (2006.01)
(52) U.S. Cl. ...................... 455/63.3; 455/63.1; 370/437
(58) Field of Classification Search ................ 455/450, 455/63.1, 63.3; 370/329, 437; 375/132
See application file for complete search history.

(56) References Cited

U.S. PATENT DOCUMENTS

| 5,323,447 A | * | 6/1994 | Gillis et al. | .................. 455/464 |
| 5,809,059 A | * | 9/1998 | Souissi et al. | ............... 375/133 |
| 5,887,022 A | * | 3/1999 | Lee et al. | ..................... 375/132 |
| 6,275,506 B1 | * | 8/2001 | Fazel et al. | .................. 370/478 |

(Continued)

FOREIGN PATENT DOCUMENTS

| JP | 7-297761 | 11/1995 |
| JP | 2002-246961 | 8/2002 |

OTHER PUBLICATIONS

PCT International Search Report; International application No. PCT/KR02/02123; International filing date: Nov. 14, 2002; Date of Mailing: Jun. 17, 2003.

(Continued)

*Primary Examiner*—Edan Orgad
*Assistant Examiner*—April S. Guzman
(74) *Attorney, Agent, or Firm*—Cantor Colburn LLP (57) ABSTRACT

Disclosed is a method and device for locally transmitting digital wireless data through a searched channel with no interference. Firstly, data is transmitted and received through a setup channel. A channel having a different frequency from the setup channel is set as a temporary replacement channel. Data is transmitted and received through the temporary replacement channel, and it is checked whether there is channel interference. When there is no channel interference, the temporary replacement channel information is stored, and data is transmitted and received after returning to the setup channel. When it is detected that channel interference continuously occurs while transmitting and receiving data through the setup channel, data is transmitted and received after changing the stored replacement channel to a new setup channel.

14 Claims, 5 Drawing Sheets

U.S. PATENT DOCUMENTS

| | | |
|---|---|---|
| 6,275,518 B1 * | 8/2001 | Takahashi et al. .......... 375/135 |
| 6,697,984 B1 * | 2/2004 | Sim et al. ................... 714/751 |
| 7,027,418 B2 * | 4/2006 | Gan et al. ................... 370/329 |
| 7,079,516 B2 * | 7/2006 | You et al. ................... 370/337 |
| 2003/0050024 A1 * | 3/2003 | Fukushima .............. 455/161.2 |
| 2003/0223485 A1 * | 12/2003 | Noma et al. ................ 375/222 |
| 2004/0203474 A1 * | 10/2004 | Miller et al. ................. 455/69 |
| 2005/0118954 A1 * | 6/2005 | Nielsen et al. ............. 455/63.3 |

OTHER PUBLICATIONS

PCT International Preliminary Examination Report; International application No. PCT/KR2002/002123; International filing date: Nov. 14, 2002; Date of Completion: Jan. 20, 2005.

* cited by examiner

Case A: Monitor F2 While using F1

Case B: When monitoring F2 while using F1, error occurs in F2, and thus monitoring frequency is changed to F3

CaSe C: Because interference occurs in F1, setup frequency is changed to F2 that has been monitored, and then F4 is monitored

APPARATUS AND METHOD FOR TRANSMITTING WIRELESS DATA USING AN ADAPTIVE FREQUENCY SELECTION

TECHNICAL FIELD

The present invention relates to a local-area wireless data transmission system, and more particularly to a method and apparatus for finding a channel frequency with no interference and transmitting real-time wireless data at the found channel frequency.

BACKGROUND ART

Bluetooth and wireless local area network (LAN) techniques using a 2.4 GHz industrial scientific medical (ISM) frequency band generally employ spread spectrum methods such as a frequency hopping spread spectrum (FHSS) method and a direct sequence spread spectrum (DSSS) method.

The DSSS method is adapted to obtain a spread signal by multiplying data by a spread code, and the FHSS method is adapted to shift a frequency band according to a spread code. In particular, the FHSS method transmits a signal to be spread while hopping its carrier frequencies at intervals of a predetermined time according to a hopping pattern, and converts a narrowband signal into a wideband signal over a time average. This FHSS method generates a random hopping pattern in an ISM band suitable to the standard of each country and transmits data at a frequency based on the generated pattern, resulting in the advantages of minimizing frequency overlap, reducing losses by a multipath owing to fast frequency conversion and being simple in construction. As a result, at the present, the FHSS method is widely used in low-price-type wireless devices (for example, Bluetooth devices).

However, the FHSS method has a disadvantage in that the hopping is performed irrespective of the presence or absence of an interference source over the entire frequency band, resulting in occurrence of a packet loss when the hopping is made to a specific frequency where interference is present. In this case, data (voice, audio and video) to be transmitted in real time cannot help suffering a degradation in quality if no error recovery is made.

DISCLOSURE OF THE INVENTION

Therefore, the present invention has been made in view of the above problems, and it is an object of the present invention to provide a method and apparatus for adaptively finding a channel frequency with no interference and transmitting wireless data at the found channel frequency, so that the quality of wireless transmission of real-time data can be enhanced by recovering a data loss resulting from intermittent interference and avoiding the influence of continuous interference.

In accordance with one aspect of the present invention, the above and other objects can be accomplished by the provision of a device for transmitting wireless data through an adaptive frequency selection by using a frequency hopping scheme, the device comprising:

a transmission data generator for appending at least a redundancy and CRC for error recovery to data to be transmitted, and interleaving and outputting the resulting data;

an access code generator for appending an access code to the outputted transmission data, and packetizing the resulting data;

an access code detector for detecting an access code from a received packet;

a received data restoration unit for checking a CRC in data of the received packet to determine whether an error occurs in the data, and then RS-decoding deinterleaved data to recover a data loss, the device further comprising:

a channel interference detector for comparing the accumulated number of non-identical bits of access codes detected for a predetermined period of time with a prestored threshold value, and detecting from the comparison result whether channel interference occurs;

a hopping frequency generator for generating random hopping frequencies in response to a device address and a clock inputted thereto; and a transmission/reception controller for searching channels of the random hopping frequencies for one channel with no interference, storing the searched channel as a replacement channel, and, if interference is continuously detected by the channel interference detector while alternately transmitting data through the setup channel and the replacement channel, and then changing the replacement channel to a new setup channel or searching for a new replacement channel and storing the searched replacement channel.

Preferably, the transmission/reception controller includes an internal memory storing program data for searching for a channel with no interference, the program data allowing the device to sequentially perform the steps of:

requesting a slave to perform a corresponding process for allowing data transmission and reception through one of the random hopping frequencies generated from the hopping frequency generator;

transmitting/receiving data through the requested channel frequency; and storing the hopping frequency as information of the replacement channel when there is no channel interference.

In accordance with another aspect of the present invention, there is provided a method for transmitting wireless data using an adaptive frequency selection, the method being used in a device which includes a master and a slave and locally transmits wireless data in a frequency-changeable manner, the method comprising the steps of:

finding and storing a replacement channel with no interference which has a different frequency from a setup channel set as a data transmission channel;

checking whether there is interference in the replacement and setup channels while alternately transmitting data through the setup and replacement channels; and when there is continuous channel interference in the setup channel, transmitting data after changing the stored replacement data to a new setup channel.

According to the present invention, a replacement channel with no interference is found and stored in advance. Thus, when channel interference continuously occurs, the stored replacement channel can be changed to a new setup channel for data transmission, thereby minimizing a data loss.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Now, preferred embodiments of the present invention will be described in detail with reference to the annexed drawings. In the following description, a detailed description of known functions and configurations incorporated herein will be omitted when it may make the subject matter of the present invention rather unclear.

Figure 1:
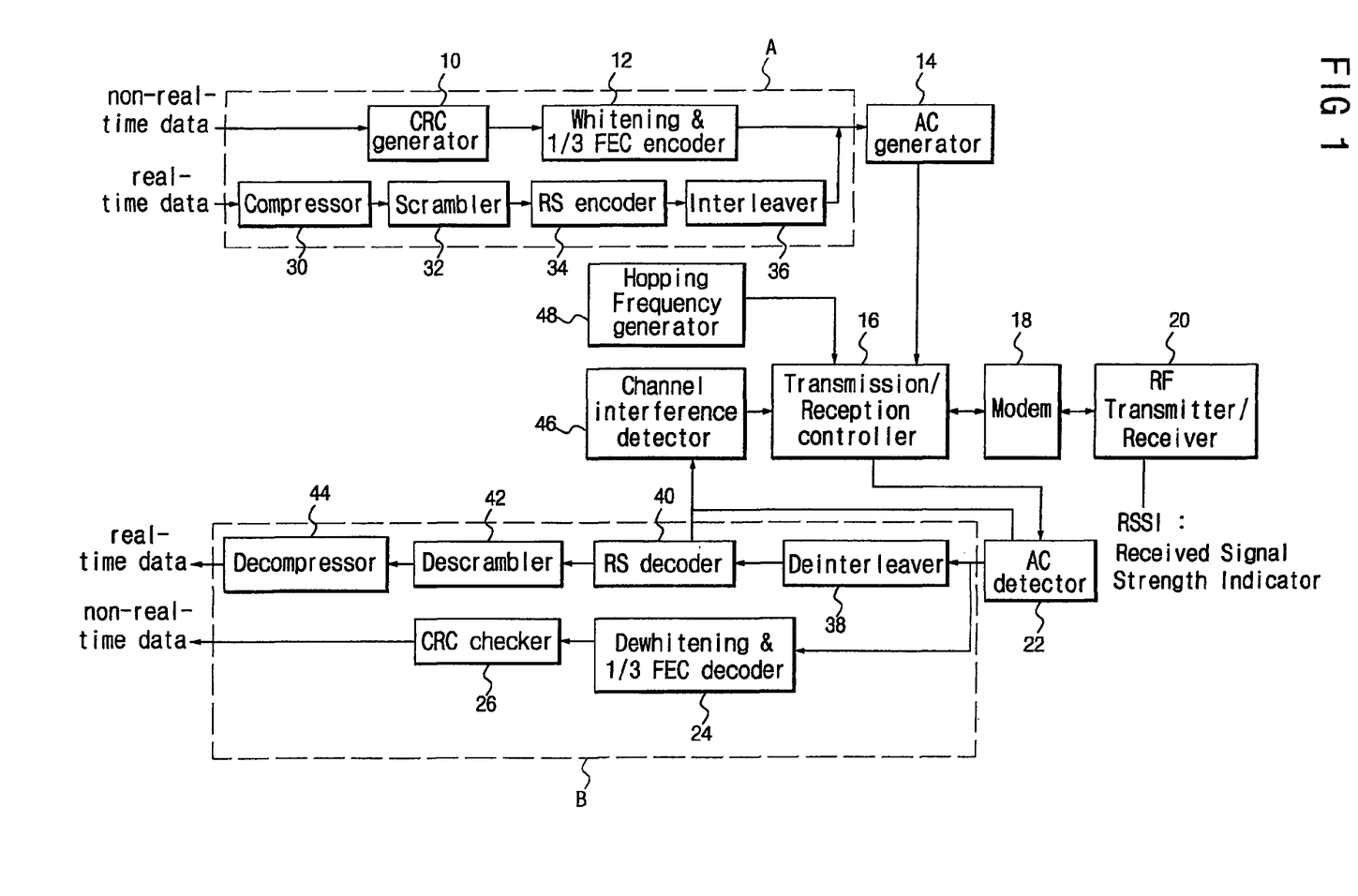
FIG. 1 is a block diagram showing the construction of a wireless data transmission apparatus in accordance with a preferred embodiment of the present invention.
Figure 2:
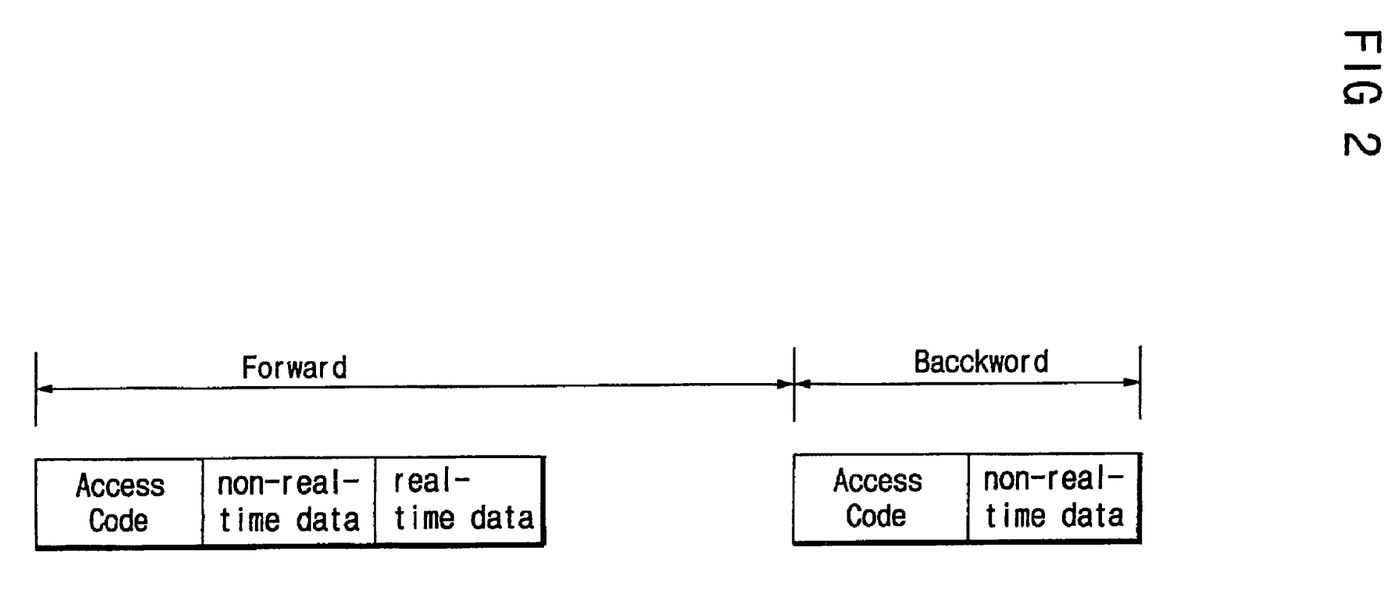
FIG. 2 is a view illustrating the structures of packets transmitted and received by the wireless data transmission apparatus in accordance with the embodiment of the present invention.

FIG. 1 is a block diagram showing the construction of a wireless data transmission apparatus in accordance with a preferred embodiment of the present invention, and FIG. 2 is a view illustrating the structures of packets transmitted and received by the wireless data transmission apparatus in accordance with the embodiment of the present invention. For reference, the wireless data transmission apparatus according to the embodiment of the present invention may be used as, for example, a wireless transmitter or wireless receiver for a surround speaker. In this case, an optical (CD/DVD) pickup reproduction device will be disposed around the wireless transmitter. The wireless transmitter according to the embodiment of the present invention will receive real-time data R/L SURROUND from a decoder AC-3, which processes a signal reproduced from an optical medium, packetize the received data by components, which will be described later, and wirelessly transmit the resulting packet through a Bluetooth radio frequency (RF) transmitter/receiver module at a short distance. Then, the wireless receiver, which is constructed as shown in FIG. 1, will receive and process the transmitted packet, so that audio sound reproduced from the optical medium can be outputted through the speaker.

A description will hereinafter be given of the construction of the wireless data transmission apparatus in accordance with the embodiment of the present invention with reference to FIG. 1. The wireless data transmission apparatus basically comprises a transmitting data generation unit A, an access code generator 14, an access code detector 22, a received data restoration unit B, a hopping frequency generator 48, a channel interference detector 46, and a transmission/reception controller 16. The wireless data transmission apparatus further comprises a modem 18 and an RF transmitter/receiver module 20, as in a general local-area wireless transmitter.

The transmitting data generation unit A acts to append at least a redundancy and CRC (Cyclic Redundancy Check (Code)) for error recovery to data to be transmitted, and interleave and output the resulting data. To this end, the transmitting data generation unit A includes, as shown in FIG. 1, a compressor 30 for compressing real-time data, a scrambler 32 for scrambling the real-time data compressed by the compressor 30, and a Reed-Solomon (RS) encoder 34. The RS encoder 34 functions to append a redundancy for error recovery to output data from the scrambler 32. The appended redundancy is used in an RS decoder 40 to be described later. An interleaver 36 is connected to the output of the RS encoder 34 to interleave the redundancy-appended real-time data to prevent a burst error from occurring in transmission.

A CRC generator 10 is provided in the transmitting data generation unit A to generate a CRC of a predetermined number of bits from non-real-time data (for example, volume control data) and append the generated CRC to a data block. A whitening & ⅓ forward error correction (FEC) encoder 12 is also provided in the transmitting data generation unit A to adjust a direct current (DC) offset for the CRC-appended data block and repeatedly output input data 3 bits by 3 bits to minimize an error possibility on a channel.

The access code generator 14 is connected to the output of the transmitting data generation unit A to append an access code to data to be transmitted, generated by the generation unit A, and packetize the resulting data. The resulting packet has a structure as shown in FIG. 2. Namely, when the subject is a master, a forward packet transmitted from the master includes an access code, non-real-time data and real-time data, and a backward packet transmitted from a slave includes an access code and non-real-time data. A data packet appended with an access code by the access code generator 14 is transmitted to a different wireless data transmission apparatus as the slave through the transmission/reception controller 16, modem 18 and RF transmitter/receiver module 20.

On the other hand, a data packet is received by the RF transmitter/receiver module 20, demodulated by the modem 18 and then inputted to the access code detector 22. The access code detector 22 detects an access code from the received packet and provides the detected access code to the channel interference detector 46 to be described later, so that it can be used for checking whether channel interference is present.

The received data restoration unit B acts to check a CRC in data of the received packet to determine whether an error has occurred in the data, and RS-decode deinterleaved data to recover a data loss. That is, in the received data restoration unit B, a deinterleaver 38 deinterleaves and outputs interleaved data, and the RS decoder 40 recovers the data packet from a loss using a redundancy contained in the deinterleaved data. The RS decoder 40 also acts to output the number of irrecoverable bit errors to the channel interference detector 46. A descrambler 42 descrambles scrambled real-time data, and a decompressor 44 decompresses and outputs the descrambled data.

A dewhitening & ⅓ FEC decoder 24 is also provided in the received data restoration unit B to perform a ⅓ rate FEC decoding operation to process non-real-time data. This ⅓ rate FEC decoding operation is performed by carrying out a majority decision (select a major binary value of 3-bit binary data) for the received packet data on a 3 bits basis. As being subjected to the ⅓ rate FEC decoding operation, the packet data is reduced to ⅓ in size. The resulting packet data is inputted to a dewhitening block, which then dewhites the inputted data on the basis of the same whitening seed value as that in the transmitter. After being subjected to the FEC decoding operation and dewhitening operation, the packet data is finally inputted to a CRC checker 26. The CRC checker 26 acts to check a CRC in the inputted packet data to determine whether an error is present in that packet data.

The channel interference detector 46 acts to accumulate the number of non-identical bits of access codes for a predetermined period of time, compare the accumulated number with a prestored threshold value, detect from the comparison result whether continuous channel interference is present, and send the detection result to the transmission/reception controller 16. Alternatively, the channel interference detector 46 may accumulate the number of data bit errors of the received packet provided from the RS decoder 40, compare the accumulated number with another threshold value and detect from the comparison result whether channel interference is present.

The hopping frequency generator 48 acts to generate random hopping frequencies in response to a device address and a clock inputted thereto. The device address is shared by the data transmission device and data reception device, and is not changed once being initially set. The clock is transferred from the master to the slave in the process of initialization and then counted up every cycle.

The transmission/reception controller 16 acts to transmit and receive data packets over a channel set up in the initialization process or a setup channel with no interference. The transmission/reception controller 16 is also adapted to search channels of the random hopping frequencies for one channel with no interference, store the searched channel as a replacement channel, alternately transmit data over the setup channel and the replacement channel, and, if continuous interference in the setup channel is detected by the channel interference detector during the data transmission, change the replacement channel to a new setup channel or search for a new replacement channel. To this end, the transmission/reception controller 16 includes a memory for storing program data for the above operation. After storing the replacement channel, the transmission/reception controller 16 discards hopping frequencies generated from the hopping frequency generator 48.

Although all the blocks for processing real-time data and non-real-time data have been disclosed, the circuit construction may be modified suitably for use as the master and slave. For example, provided that the present wireless data transmission apparatus is used as the slave, the functional blocks for generation of real-time data may be removed from the transmitting data generation unit.

A description will hereinafter be given of the operation of the local-area wireless data transmission apparatus with the above-stated construction which searches for a channel with no interference and changes a current channel to the searched channel.

Figure 3:
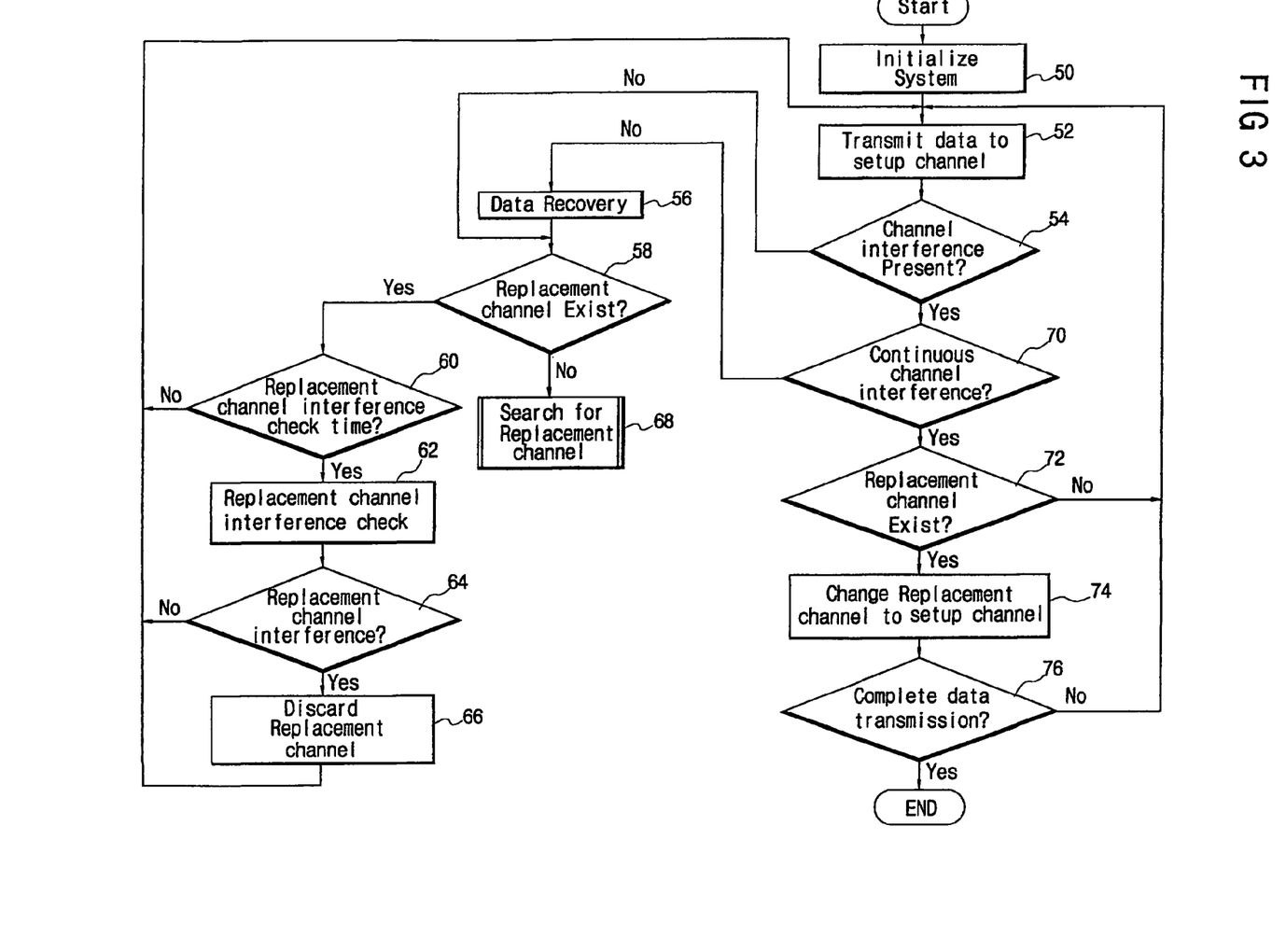
FIG. 3 is a flow chart illustrating the entire procedure of changing a current channel to a channel with no interference in accordance with the embodiment of the present invention.
Figure 4:
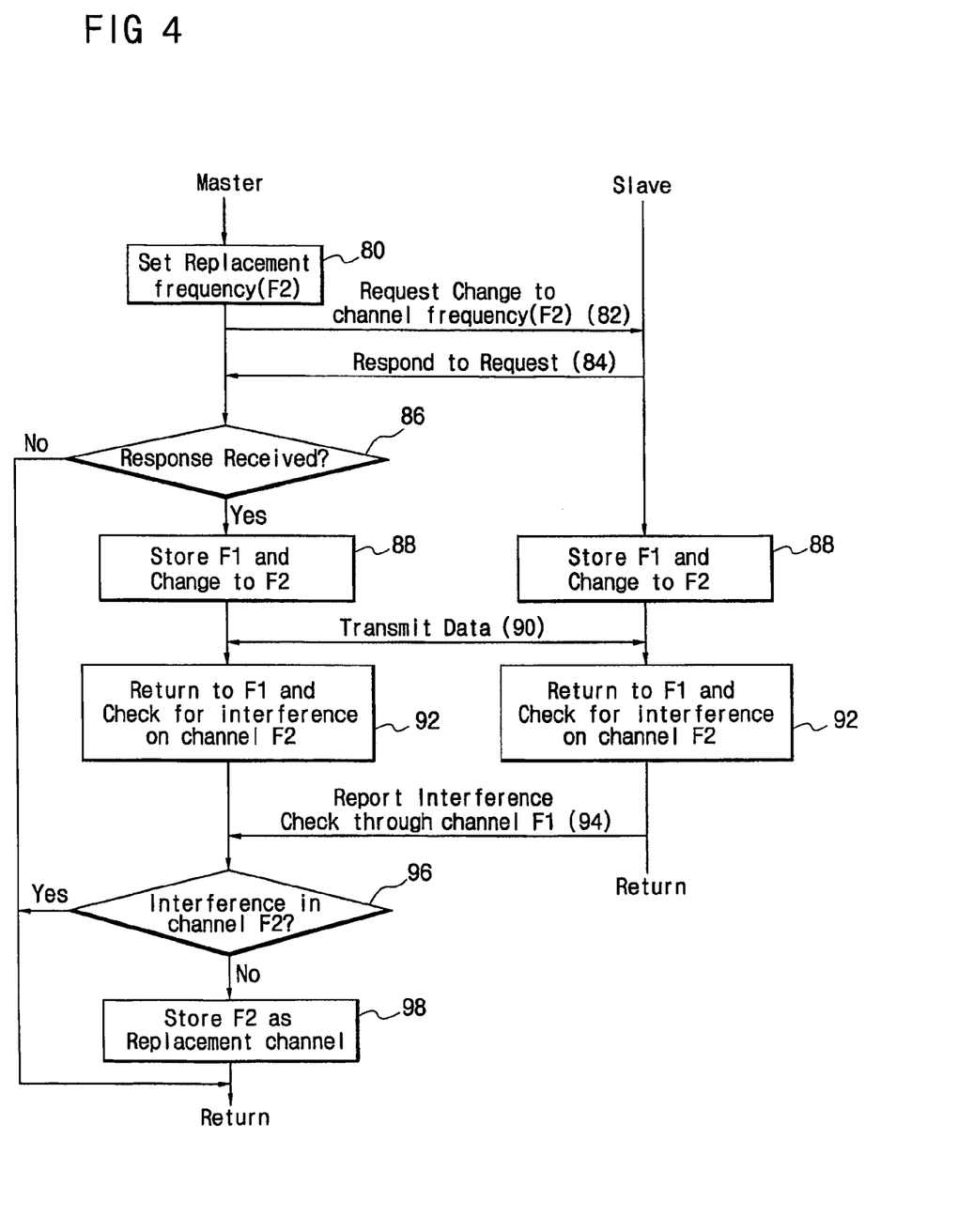
FIG. 4 is a flow chart illustrating the step in FIG. 3 of searching for a replacement channel with no interference.
Figure 5:
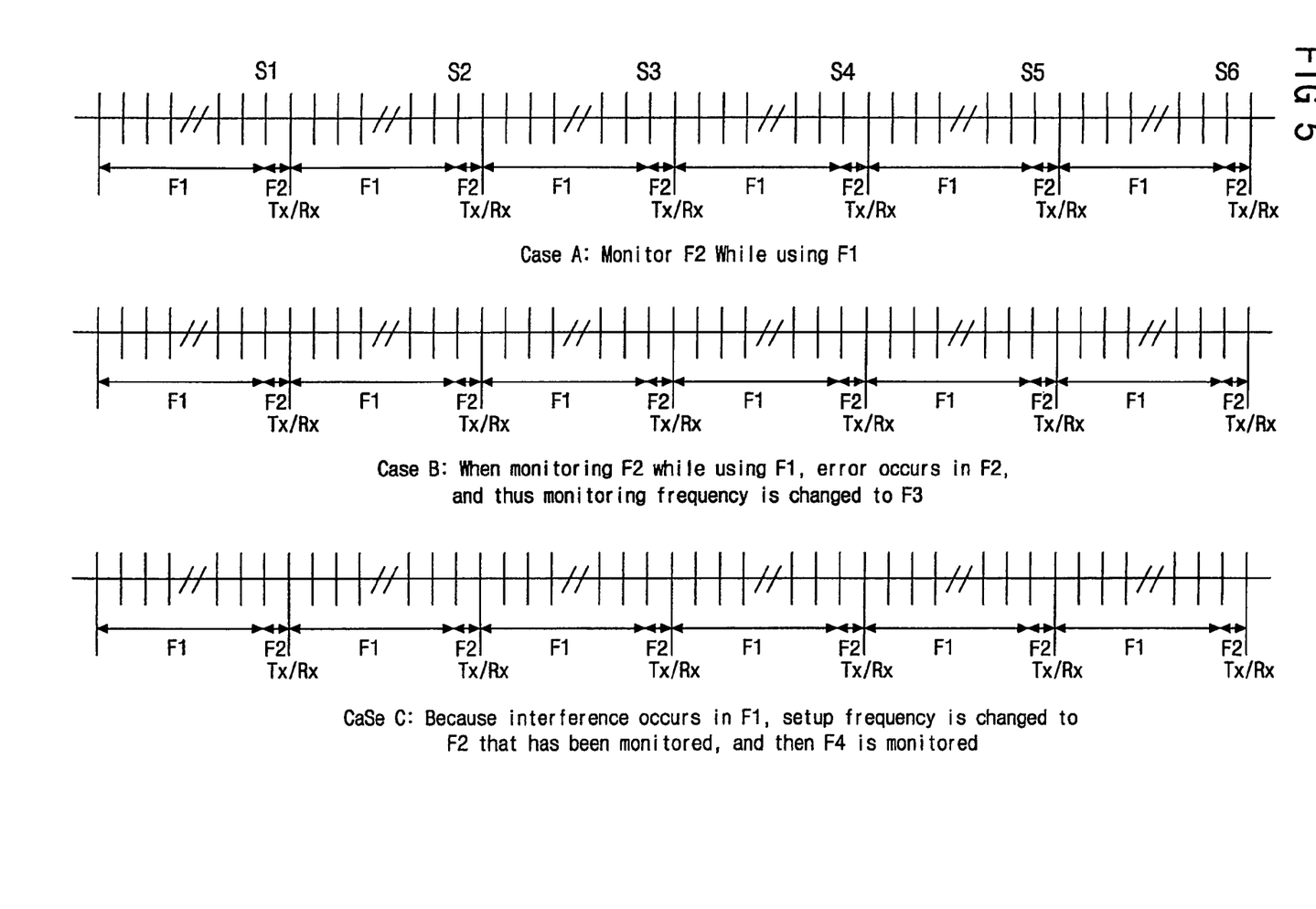
FIG. 5 is a view supplementarily illustrating the step in FIG. 3 of periodically checking whether a replacement channel is subject to interference.

FIG. 3 is a flow chart illustrating the entire procedure of changing a current channel to a channel with no interference in accordance with the embodiment of the present invention, FIG. 4 is a flow chart illustrating the step in FIG. 3 of searching for a replacement channel with no interference, and FIG. 5 is a view supplementarily illustrating the step in FIG. 3 of periodically checking whether a replacement channel is subject to interference.

With reference to FIG. 3, the local-area wireless data transmission apparatuses, which are equipped respectively with, for example, Bluetooth modules and correspond respectively to the master and slave, each set up a channel frequency for data packet transmission through a system initialization step (step 50). In the below description, such a channel for data packet transmission will be referred to as a "setup channel". If the setup of a channel for packet transmission is completed, then the master and slave each transmit data over the setup channel (step 52). During this data transmission, the transmission/reception controller 16 checks through the channel interference detector 46 whether interference is present in the setup channel (step 54). The channel interference can be classified into intermittent interference and continuous interference. It should be noted that a data loss by the continuous interference is not recoverable, whereas a data loss by the intermittent interference is recoverable by the RS decoder. In this regard, according to the present invention, the transmission/reception controller 16 is programmed to make a distinction between the continuous interference and the intermittent interference and recover a data loss, or change a current channel to a channel with no interference unless the data loss is recoverable. For reference, the check on whether channel interference is present can be made on the basis of the number of bit errors of real-time data or non-real-time data inserted in a received packet, or based on whether access codes inserted in transmitted and received packets are coincident with each other. In the case where an accumulated number of bit errors of real-time data or non-real-time data for a predetermined period of time, or an accumulated number of non-identical bits of access codes exceeds a prestored corresponding threshold value, the channel interference may be determined to be the continuous interference. In other words, in the case where an accumulated number of bit errors of real-time data or non-real-time data for a predetermined period of time, or an accumulated number of non-identical bits of access codes does not exceed a prestored corresponding threshold value, since it is within a range in which the data can be recovered by interleaving, it may be determined that channel interference does not exist.

If no channel interference is determined to be present at the above step 54, then the transmission/reception controller 16 proceeds to step 58 to check whether a stored replacement channel is present. This replacement channel signifies a new channel to which a channel (setup channel) currently transmitting data is to be changed for data transmission when it is subject to the continuous interference. If a previously searched and stored replacement channel is present, then the transmission/reception controller 16 moves to step 60 to check whether the current time has reached a time to check whether interference is present in the replacement channel. If such a replacement channel is not present, the procedure moves to step 68.

On the other hand, in the case where channel interference is present but it is intermittent, i.e., in the case where an accumulated number of bit errors of real-time data or non-real-time data for a predetermined period of time, or an accumulated number of non-identical bits of access codes exceeds a prestored corresponding threshold value, the procedure moves to step 56 for data recovery. It is preferable to define such a predetermined period of time to be a data period in which it is possible to recover a data loss using a redundancy that the slave obtains by deinterleaving data interleaved by and transmitted from the master. In such a case where data recovery is possible even thought intermittent interference is present, the transmittance/reception controller 16 checks whether a replacement channel is present, while leaving the current setup channel unchanged (i.e., without channel change) (step 58). If there is no replacement channel, the controller 16 moves to step 68 to search for the replacement channel by the procedure of a subroutine shown in FIG. 4.

Hereinafter, the procedure until the replacement channel is searched and stored is described referring to FIGS. 4 and 5.

Firstly, the transmission/reception controller 16 of the master sets up a replacement channel frequency F2 in step 80. In this case, it may be assumed that a channel frequency currently used for data transmission is F1. In addition, it may be assumed that the replacement channel frequency F2 to be newly set up is a temporary replacement channel frequency. For the replacement channel frequency F2, it is possible to use hopping frequencies randomly generated from the hopping frequency generator 48. After setting one of the hopping frequencies from the hopping frequency generator 48 as the temporary replacement channel frequency F2, the transmission/reception controller 16 requests the slave to change the current channel frequency to the channel frequency F2 in step 82. This request to change the channel frequency is performed through the current setup channel of F1. Then, the slave of the transmission/reception controller responds to the channel change request in step 84. In this case that the setup channel of F1 is changed to the temporary replacement channel of F2, the slave must respond to the channel change request even when there are few accumulated bit errors of the access code and the real-time data that were received from the master through the setup channel of F1 until this time. This is for the following reasons. Even though the real-time data is normally received until this time, i.e., before changing to the replacement channel of F2, in the case where a data loss occurs in the received data after changing to the replacement channel of F2 and then the channel returns to the setup channel of F1, there must be no data loss for a specific time after returning to the setup channel of F1 in order to achieve the interleaving effect and recover the data loss occurring during the period of the replacement channel.

When the transmission/reception controller of the slave issue a response to the channel change request, the transmission/reception controller 16 of the master receives the response in step 86 and then moves to step 88. In step 88, the transmission/reception controllers 16 of both the master and slave change the channel to the temporary replacement channel of F2 after storing the current setup channel of F1, and then transmits data through the temporary replacement channel of F2 in step 90.

As shown in case A of FIG. 5, in the case where the channel frequency changes from F1 to F2 and then returns to F1, the slave must respond to the channel change request as in step 82, provided it is considered that it is possible to recover the data loss in the frequency F2 by using data received through both the former and latter frequencies F1. This is for the following reasons. There is no problem when channel interference does not occur in the frequency F2. However, if channel interference occurs in the frequency F2, causing a data loss in the real-time data, it is necessary to recover the data loss using both the received data before changing to F2 and after returning to F1.

In step 90, each of the transmission/reception controllers 16 of the master and the slave transmits data through the temporary replacement channel of F2 during a predetermined period (i.e., replacement channel maintaining period), and then the controllers move to step 92 to return to the frequency F1 and check whether interference is present in the channel of F2. The check on whether interference is present in the channel of F2 can be made on the basis of the number of bit errors of real-time data or non-real-time data, or based on whether access codes are coincident with each other, as mentioned above. After checking whether there is interference in the channel of F2, the transmission/reception controller 16 of the slave reports the checked result to the master in step 94.

In this case, in step 96, the transmission/reception controller 16 of the master determines whether interference is present in the channel of F2, based on the checked result from the slave as well as its own checked result. If it is determined that there is interference in the channel of F2, the procedure returns to the main routine as shown in FIG. 3, and the replacement channel search process as mentioned above is performed again in the next super frame period. Here, a super frame is defined as a set of a number of data packets. If it is determined in step 96 that there is no interference in the temporary replacement channel of F2, the channel of F2 is stored in the internal memory as a normal replacement channel with no interference in step 98, and then the procedure returns to the main routine.

In other words, the replacement channel search is performed when there is no stored replacement channel, and the method for searching for the replacement channel is performed in such a manner that, when the slave in the setup channel of F1 responds to the channel change request in each super frame period, the channel is changed to the temporary replacement channel of F2 and data is transmitted through the channel of F2, and during the data transmission in the channel of F2, it is checked whether there is interference in the channel of F2 in order to search for a replacement channel with no interference. The current setup channel is continuously used when it is impossible to find the replacement channel with no interference.

The remaining operation of the transmission/reception controller 16 is described referring to FIG. 3, after the replacement channel information is stored in the controller.

If it is detected that there is intermittent interference or there is no interference, while transmitting data through the setup channel, the controller 16 moves to step 58 to check whether there is a replacement channel. If the checked result is that the replacement channel is found and stored by the method as shown in FIG. 4, the controller 16 moves to step 60 to check whether the current time has reached a time to check whether there is interference in the replacement channel. This check time occurs periodically at intervals of the super frame periods Sn, and the super frame size depends on the interleaving size.

When the time comes to check whether there is interference in the replacement channel (step 60) while data is transmitted through the setup channel F1 in one super frame Sn, the controller 16 changes the channel from the setup channel of F1 to the stored replacement channel of F2 and transmits real-time data through the replacement channel of F2. Then, the master and the slave check whether there is interference in the replacement channel F2 in step 64. If there is no such interference, the channel returns to the setup channel, whereas, if there is interference, the channel returns to the setup channel after discarding the replacement channel in step 66. That is, according to the present invention, the check on whether there is interference in the searched replacement channel is performed periodically, specifically, by transmitting real-time data through the replacement channel during a predetermined period (i.e., replacement channel maintaining period) in each super frame. If there is interference in the replacement channel, the transmission/reception controller 16 discards the stored replacement channel in step 66 because there is no need to maintain it, and returns to step 52. In this case, the replacement channel search routine as shown in FIG. 4 is performed again because there is no replacement channel. When it is determined that there is no interference in the replacement channel in step 64, the controller 16 moves to step 52 and checks whether there is interference in the setup channel of F1, while transmitting data again through the setup channel F1.

Referring to FIG. 5, it is checked whether there is interference in the setup channel and the replacement channel, alternately, in such a manner that data is transmitted through the setup channel of F1 during a first period of each super frame (S1, S1, ... ), and, after the channel is changed to the replacement channel of F2 when the time comes to check whether there is interference in the replacement channel, data is transmitted through the replacement channel of F2 during a second period of each super frame. In FIG. 5, "Case A" indicates the case where the setup channel of F1 is used while monitoring the channel of F2. "Case B" indicates the case where the setup channel of F1 is used while monitoring the channel of F2 and, in addition, it is detected that there is interference in the replacement channel of F2 while monitoring the channel of F2, and then a new replacement channel is set to be checked on its interference. For example, even though the checked result in step 64 is that intermittent interference occurs in the replacement channel, the replacement channel can be discarded, provided that the intermittent interference continuously occurs during a number of monitoring periods. This example is only an optional feature.

In step 70, when a continuous monitoring of the stored replacement channel of F2 results in a determination that there is no interference in the channel of F2, and, in addition, there is continuous interference in the channel of F1, the transmission/reception 16 moves to step 74. In step 74, the controller 16 transmits data after changing the stored replacement channel F2 to a new setup channel. Of course, before this channel change, it is necessary to request the slave to change the channel. Upon receipt of a response to such a request, transmission/reception controller 16 of the master communicates real-time data with the slave through the replacement channel.

Thus, the master and slave can transmit data through the channel of F2 with no interference. Until the data transmission is completed, the controller 16 must check whether there is interference in the setup channel in each super frame, and search for a new replacement channel by the method as shown in FIG. 4. If a new replacement channel of F3 is found, it is checked whether there is interference in the channel of F2 while transmitting data through the channel of F2, and then, at the end portion of the corresponding super frame, it is checked whether there is interference in the found replacement channel of F3 while transmitting data through the replacement channel of F3. In such a manner, alternate interference checks between the setup channel of F2 and the replacement channel of F3 are repeatedly performed. Such a repeating procedure corresponds to "Case C" of FIG. 5. In "Case C" of FIG. 5, because interference occurs in the setup channel of F1, the channel is changed to the replacement channel of F2 that has been monitored, and thereafter a new replacement channel of F4 is monitored.

According to the present invention, after finding a replacement channel with no interference, it is checked whether there is interference in the setup channel and the replacement channel while alternately transmitting data through the setup and replacement channels in each super frame, as mentioned above. Therefore, even through interference continuously occurs in the current setup channel, the channel can be easily changed to the replacement channel with no interference that has been monitored until this time, thereby minimizing a data loss caused by channel interference.

INDUSTRIAL APPLICABILITY

As apparent from the above description, in preparation for the case where interference continuously occurs in the current setup channel, a replacement channel frequency is searched and stored as a preparatory channel in advance. Thus, the present invention has an advantage in that, even though interference continuously occurs in the current setup channel, the channel can be easily changed to the stored replacement channel, thereby minimizing a real-time data loss caused by continuous channel interference.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for transmitting wireless data using an adaptive frequency selection, the method being used in a device which includes a master and a slave and locally transmits wireless data in a frequency-changeable manner, the method comprising the steps of:

setting up a setup channel for data transmission;

the master and the slave transmitting data through the setup channel at a first channel frequency;

checking whether there is channel interference in the setup channel;

checking whether a replacement channel is stored if channel interference within a recoverable range occurs within the setup channel;

where no replacement channel is stored, setting a channel having a second frequency different from the first frequency as a temporary replacement channel; and requesting the slave to change the first channel frequency to the second channel frequency;

transmitting data through the temporary replacement channel if a response to the request for changing channel frequencies is received from the slave;

storing the temporary replacement channel as a replacement channel if there is no channel interference in the temporary replacement channel;

checking whether there is interference in the replacement channel and the setup channel while alternately transmitting data through the setup channel and the replacement channels; and when there is continuous channel interference in the setup channel, transmitting data after changing the stored replacement data to a new setup channel.

2. The method as set forth in claim 1, further comprising the step of:

when there is continuous interference in the replacement channel, discarding the stored replacement channel information, and finding and storing a new replacement channel with no interference.

3. The method as set forth in claim 1, wherein the slave reports to the master information on whether channel interference occurs while transmitting data through the stored replacement channel.

4. The method as set forth in claim 3, wherein the check on whether there is channel interference is performed based on whether access codes inserted in transmitted and received packets are identical.

5. The method as set forth in claim 3, wherein the check on whether there is channel interference is performed based on the number of RS-decoder bit errors of real-time data inserted in a received packet, or based on the number of bit errors of non-real-time data known to the master and slave.

6. The method as set forth in claim 4, wherein a check on whether the channel interference continuously occur is performed by comparing the accumulated number of the bit errors of the real-time data and non-real-time data or the accumulated number of the non-identical bits of the access codes for a predetermined period of time with a corresponding prestored threshold value.

7. The method as set forth in claim 1, wherein a length of data transmission period through the replacement channel is set to a length in which it is possible for the slave to recover loss of data transmitted through the replacement channel by obtaining and deinterleaving both data received before changing to the replacement channel and data received after returning to the setup channel.

8. A method for transmitting wireless data using an adaptive frequency selection, the method being used in a device which includes a master and a slave and locally transmits wireless data in a frequency-changeable manner, the method comprising the steps of:
   a first step of transmitting and receiving data through a setup channel;
   a second step of checking whether there is channel interference in the setup channel;
   a third step of when the channel interference within a recoverable range occurs in the setup channel, checking whether a replacement channel is stored;
   a fourth step of when the replacement channel is not stored, setting a channel, which has a different frequency from the setup channel, as a temporary replacement channel, and then checking whether there is channel interference while transmitting and receiving data;
   a fifth step of, when there is no channel interference, storing the temporary replacement channel as a replacement channel and then returning to the setup channel;
   a sixth step of checking whether there is interference in the setup channel and the stored replacement channel while alternately transmitting data through the setup channel and the stored replacement channel; and
   a seventh step of when there is channel interference in the stored replacement channel, discarding stored replacement channel information and returning to the first step; and
   an eighth step of, when interference continuously occurs in the setup channel, transmitting data after changing the stored replacement channel to a new setup channel.

9. A device for transmitting wireless data through an adaptive frequency selection by using a frequency hopping scheme, the device comprising:
   a transmission data generator for appending at least a redundancy and CRC for error recovery to data to be transmitted, and interleaving and outputting the resulting data;
   an access code generator for appending an access code to the outputted transmission data, and packetizing the resulting data;
   an access code detector for detecting an access code from a received packet;
   a received data restoration unit for checking a CRC in data of the received packet to determine whether an error occurs in the data, and then RS-decoding deinterleaved data to recover a data loss, the device further comprising:
   a channel interference detector for comparing the accumulated number of non-identical bits of access codes detected for a predetermined period of time with a prestored threshold value, and detecting from the comparison result whether channel interference occurs;
   a hopping frequency generator for generating random hopping frequencies in response to a device address and a clock inputted thereto; and
   a transmission/reception controller for searching channels of the random hopping frequencies for one channel with no interference, storing the searched channel as a replacement channels if channel interference within a recoverable range occurs in the setup channel, and then changing the replacement channel to a new setup channel or searching for a new replacement channel and storing the searched replacement channel if interference is continuously detected by the channel interference detector while alternately transmitting data through the setup channel and the replacement channel.

10. The device as set forth in claim 9, wherein the channel interference detector detects whether channel interference occurs by accumulating the number of data bit errors of the received packet and then comparing the accumulated number of data bit errors with another threshold value.

11. The device as set forth in claim 9, wherein the transmission/reception controller includes an internal memory storing program data for searching for a channel with no interference, the program data allowing the device to sequentially perform the steps of:
   requesting a slave to perform a corresponding process for allowing data transmission and reception through one of the random hopping frequencies generated from the hopping frequency generator;
   transmitting/receiving data through the requested channel frequency; and
   storing the hopping frequency as information of the replacement channel when there is no channel interference.

12. The method as set forth in claim 2, wherein the slave reports to the master information on whether channel interference occurs while transmitting data through the stored replacement channel.

13. The method as set forth in claim 5, wherein a check on whether the channel interference continuously occur is performed by comparing the accumulated number of the bit errors of the real-time data and non-real-time data or the accumulated number of the non-identical bits of the access codes for a predetermined period of time with a corresponding prestored threshold value.

14. The method as set forth in claim 2, wherein a length of data transmission period through the replacement channel is set to a length in which it is possible for the slave to recover loss of data transmitted through the replacement channel by obtaining and deinterleaving both data received before changing to the replacement channel and data received after returning to the setup channel.

* * * * *